United States Patent
Lee et al.

(10) Patent No.: US 8,462,149 B2
(45) Date of Patent: Jun. 11, 2013

(54) METHOD AND APPARATUS FOR REAL TIME 3D MESH COMPRESSION, BASED ON QUANITZATION

(75) Inventors: Seung Wook Lee, Daejeon (KR); Bon Ki Koo, Daejeon (KR); Jin Seo Kim, Daejeon (KR); Young Jik Lee, Daejeon (KR); Ji Hyung Lee, Daejeon (KR); Ho Won Kim, Daejeon (KR); Chang Woo Chu, Daejeon (KR); Bon Woo Hwang, Daejeon (KR); Jeung Chul Park, Daejeon (KR); Ji Young Park, Daejeon (KR); Seong Jae Lim, Daejeon (KR); Il Kyu Park, Daejeon (KR); Yoon-Seok Choi, Daejeon (KR); Kap Kee Kim, Daejeon (KR); Euee Seon Jang, Seoul (KR); Daiyong Kim, Seoul (KR); Byoungjun Kim, Seoul (KR); Jaebum Jun, Seoul (KR); Giseok Son, Seoul (KR); Kyoung Soo Son, Seoul (KR)

(73) Assignees: Electronics and Telecommunications Research Institute, Daejeon (KR); Industry-University Cooperation Foundation Hanyang University, Seoul (KR)

( * ) Notice: Subject to any disclaimer, the term of this patent is extended or adjusted under 35 U.S.C. 154(b) by 302 days.

(21) Appl. No.: 12/988,305
(22) PCT Filed: Apr. 16, 2009
(86) PCT No.: PCT/KR2009/001972
§ 371 (c)(1),
(2), (4) Date: Oct. 15, 2010
(87) PCT Pub. No.: WO2009/128660
PCT Pub. Date: Oct. 22, 2009

(65) Prior Publication Data
US 2011/0037763 A1    Feb. 17, 2011

(30) Foreign Application Priority Data

Apr. 18, 2008    (KR) .................. 10-2008-0036372
Dec. 10, 2008    (KR) .................. 10-2008-0125521

(51) Int. Cl.
*G06T 15/00*    (2006.01)
(52) U.S. Cl.
USPC ......................................................... 345/419
(58) Field of Classification Search
None
See application file for complete search history.

(56) References Cited

U.S. PATENT DOCUMENTS 6,009,201 A    12/1999    Acharya
6,546,141 B1    4/2003    Jung et al.

(Continued)

FOREIGN PATENT DOCUMENTS

KR    1020010014332 A    2/2001
KR    1020050123396 A    12/2005

OTHER PUBLICATIONS

Byoungjun Kim et al., "Fast 3D Mesh Compression", ISO/IEC JTC1/SC29/WG11 MPEG2008/M15376, Apr. 2008, Archamps, FR.

(Continued)

*Primary Examiner* — Xiao M. Wu
*Assistant Examiner* — Mohammad H Akhavannik

(57) ABSTRACT

An apparatus for 3D mesh compression based on quantization, includes a data analyzing unit (510) for decomposing data of an input 3D mesh model into vertices information (511) property information (512) representing property of the 3D mesh model, and connectivity information (515) between vertices constituting the 3D mesh model: and a mesh model quantizing unit (520) for producing quantized vertices and property information of the 3D mesh model by using the vertices, property and connectivity information (511, 512, 513). Further, the apparatus for 3D mesh compression based on quantization includes a decision bit encoding unit (535) for calculating a decision bit by using the quantized connectivity information and then encoding the quantized vertex information, property information and connectivity information (511, 512, 513) by using the decision bit.

12 Claims, 5 Drawing Sheets

U.S. PATENT DOCUMENTS

| | | | |
|---|---|---|---|
| 6,563,500 B1 | 5/2003 | Kim et al. | |
| 6,975,318 B2 * | 12/2005 | Junkins et al. | 345/423 |
| 2003/0142098 A1 * | 7/2003 | Kim et al. | 345/475 |
| 2006/0004566 A1 | 1/2006 | Oh et al. | |
| 2009/0263029 A1 * | 10/2009 | Chang et al. | 382/232 |

OTHER PUBLICATIONS

International Search Report for PCT/KR2009/001972 filed on Apr. 16, 2009.

* cited by examiner

*(PRIOR ART)*

METHOD AND APPARATUS FOR REAL TIME 3D MESH COMPRESSION, BASED ON QUANITZATION

TECHNICAL FIELD

The present invention relates to image compression, and, more particularly, a method and apparatus for real-time 3D mesh compression, based on quantization, to quantize vertex information, property information and connectivity information of a 3D mesh model, calculate a bit (decision bit) to be allocated by using the quantized connectivity information, thereby encoding the quantized vertex information, property information and connectivity information by using the decision bit.

BACKGROUND ART

In computer graphics, triangular meshes are widely used to render realistic 3D images. A realistic 3D image represented by a triangular mesh includes vertices information on vertices of triangles in the mesh and connectivity information on connectivity between vertices, and hence has a much larger amount of data compared to a regular 2D image.

Accordingly, research efforts have been continuously made to solve the problems in storage and transmission of 3D images represented by triangular meshes.

Although 3D graphics is in demand recently, its use is limited because of vast amount of data being required.

For example, when vertices information of a 3D mesh model is represented using 32-bit floating-point numbers, representing a single vertex requires 96 bits (12 bytes) of memory.

Therefore, a 3D mesh model having 10,000 vertices as vertices information will require 120 KB of storage, and a 3D mesh model having 100,000 vertices will require 1.2 MB of storage.

Further, connectivity information may include repeated vertex references, requiring a significant amount of storage.

To cope with the requirement of the huge amount of data, coding schemes for compressing 3D images have been developed. For example, a 3D mesh coding (3DMC) scheme is adopted in virtual reality modeling language (VRML) and the MPEG-4 ISO/IEC standard. Particularly, in the MPEG-4 standard, the 3DMC scheme provides a compression tool for an IndexedFaceSet node representing a 3D model in a VRML file, and enables compression and decompression of the geometry and connectivity information of the 3D model to thereby increase efficiency of transmission of 3D mesh information.

FIG. 1 is a block diagram of an existing 3DMC encoder 110.

Referring to FIG. 1, the existing 3DMC encoder 110 includes a topological surgery module 111 decomposing a 3D mesh model being source data having vertex, connectivity and property information into 2D meshes, a vertex information encoding module 112, a connectivity information encoding module 113, a property information encoding module 114, and an entropy encoding module 115 compressing the results encoded by the vertex information encoding module 112, connectivity information encoding module 113 and property information encoding module 114 into a 3DMC bitstream.

In the 3DMC encoder 110, the main feature of 3DMC a topological surgery performed by the topological surgery module 111 to obtain a high compression ratio. In topological surgery, a triangular mesh of a 3D model is assumed to be homeomorphic to a sphere, and is converted into a 2D mesh structure by cutting the triangular mesh along the cutting edges.

FIG. 2 is a block diagram of a 3DMC decoder 210 corresponding to the 3DMC encoder 110 of FIG. 1.

Referring to FIG. 2, the 3DMC decoder 210 includes an entropy information decoding module 211, vertex information decoding module 212, connectivity information decoding module 213, property information decoding module 214, and topological synthesis module 215, and restores the original 3D model data from a 3DMC bitstream.

FIG. 3 illustrates an overall structure of a bitstream representing mesh information of a 3D model produced by the encoder of FIG. 1.

Referring to FIG. 3, a bitstream representing encoded mesh information of a 3D model includes a triangle tree 303 related to a binary triangle spanning tree composed of triangular strips, a vertex graph 301 indicating edges between vertices cutting the 3D mesh, and triangle data 305 related to data values of the 3D mesh.

FIGS. 4 to 7 illustrate steps involved in topological surgery of a 3D mesh model.

A 3D mesh model shown in FIG. 4 is cut along the cut edges (marked in thick lines), resulting in a triangle tree shown in FIG. 5.

For fast processing of graphics data, objects are generally modeled in units of triangles, and triangles are preferably connected together to form a strip or fan rather than an arbitrary pattern. Repeated symbols in graphics data result in a high compression ratio. In conventional topological surgery, a 3D mesh model is cut along the cut edges into a triangle tree as shown in FIG. 5.

Next, a reference point is selected from the triangle tree, and a link is made between the selected reference point and the outermost vertex of a branching triangle, resulting in a vertex graph as shown in FIG. 6.

Then, a bounding loop is formed using the vertex graph, as shown in FIG. 7.

As described above, in the MPEG-4 3DMC scheme, compression of a 3D model represented by an IndexedFaceSet node involves the process of topological surgery to decompose the mesh structure of the 3D model into a 2D mesh map structure.

Although, representing a 3D mesh structure by a vertex graph and triangle tree enables achievement of a high compression ratio for a 3D model, which may cause a problem of changing original vertex position information of the 3D model.

That is, for further compression after topological surgery, the existing 3DMC encoder sends a newly indexed version of the vertex position information of the 3D model to the 3DMC decoder.

Consequently, the 3DMC decoder may be unaware of the original vertex position information of the 3D model so that an animation application requiring information on the order of vertices may be not supported.

In addition, whereas topological surgery, decomposing the connectivity information of a 3D mesh into a 2D mesh map, triangle tree and vertex graph, is effective for achievement of a high compression ratio, but it involves complex operations consuming most of the time and resources needed in compression.

DISCLOSURE OF INVENTION

Technical Problem

In view of the above, the present invention provides an apparatus for 3D mesh compression, to quantize vertex information, property information and connectivity information of a 3D mesh model, without performing topology surgery; calculate a decision bit by using the quantized connectivity information; and encode the quantized vertex information, property information and connectivity information by using the decision bit, thereby reducing complexity in data compression of the 3D mesh model and to improve a compression speed.

Further, the present invention provides a 3D mesh compression method using the above low complexity 3D mesh compression apparatus.

Furthermore, the present invention provides a computer-readable medium storing a computer-executable program to execute the above 3D mesh compression method.

Technical Solution

In accordance with a first aspect of the present invention, there is provided an apparatus for 3D mesh compression based on quantization, including: a data analyzing unit for decomposing data of an input 3D mesh model into vertices information, property information representing property of the 3D mesh model, and connectivity information between vertices constituting the 3D mesh model; a mesh model quantizing unit for producing quantized vertices and property information of the 3D mesh model by using the vertices, property and connectivity information; and a decision bit encoding unit for calculating a decision bit by using the quantized connectivity information and then encoding the quantized vertex information, property information and connectivity information by using the decision bit.

The data analyzing unit may comprise a microprocessor that computes a complexity value of the 3D mesh model, and subdivides, when the computed complexity value is greater than a preset complexity threshold, the 3D mesh model into multiple smaller mesh models.

The complexity value of the 3D mesh model may be determined by the number of faces in a FaceSet.

Further, the connectivity information may be represented by an index list containing indices of multiple vertices forming a unit polygon.

The property information may comprise normals, colors, and texture coordinates of unit polygons forming the 3D mesh model.

Further, the data analyzing unit may comprise a header storing data regarding the geometry, property and connectivity information of the 3D mesh model.

In accordance with a second aspect of the present invention, there is provided a method for 3D mesh compression based on quantization, including: decomposing an input 3D mesh model into vertices information, property information representing property of the 3D mesh model, and connectivity information between vertices constituting the 3D mesh model; producing quantized vertices, property and connectivity information of the 3D mesh model by using the vertices, property and connectivity information; and calculating a decision bit by using the quantized connectivity information, and then encoding the quantized vertex information, property information and connectivity information by using the decision bit.

Here, decomposing the connectivity information between vertices constituting the 3D mesh model may further comprise calculating complexity of the 3D mesh model; and subdividing the 3D mesh model into multiple mesh according to the result of comparing complexity value of the calculated 3D mesh model and preset complexity.

The complexity value may be determined by the number of faces in a FaceSet representing the 3D mesh model.

Further, the connectivity information may be represented by an index list containing indices of multiple vertices forming a polygon.

The property information may comprise normals, colors, and texture coordinates of polygons forming the 3D mesh model.

Further, decomposing the connectivity information between vertices constituting the 3D mesh model may further comprise storing data regarding the vertex, property and connectivity information of the 3D mesh model.

In accordance with a third aspect of the present invention, there is provided a computer-readable storage medium for storing a computer-executable program to execute the method described above.

In accordance with the present invention, vertex information, property information and connectivity information of a 3D mesh model are quantized, without performing topology surgery, a decision bit is calculated by using the quantized connectivity information, and the quantized vertex information, property information and connectivity information is encoded by using the decision bit, thereby reducing complexity in data compression of the 3D mesh model and to improve a compression speed.

Accordingly, the compressed 3D mesh model can be rapidly and accurately decompressed, enhancing resource usage efficiency.

BRIEF DESCRIPTION OF DRAWINGS

The objects and features of the present invention will become apparent from the following description of embodiments given in conjunction with the accompanying drawings, in which.

BEST MODE FOR CARRYING OUT THE INVENTION

Hereinafter, embodiments of the present invention will be described in detail with reference to the accompanying drawings which form a part hereof.

Figure 8:
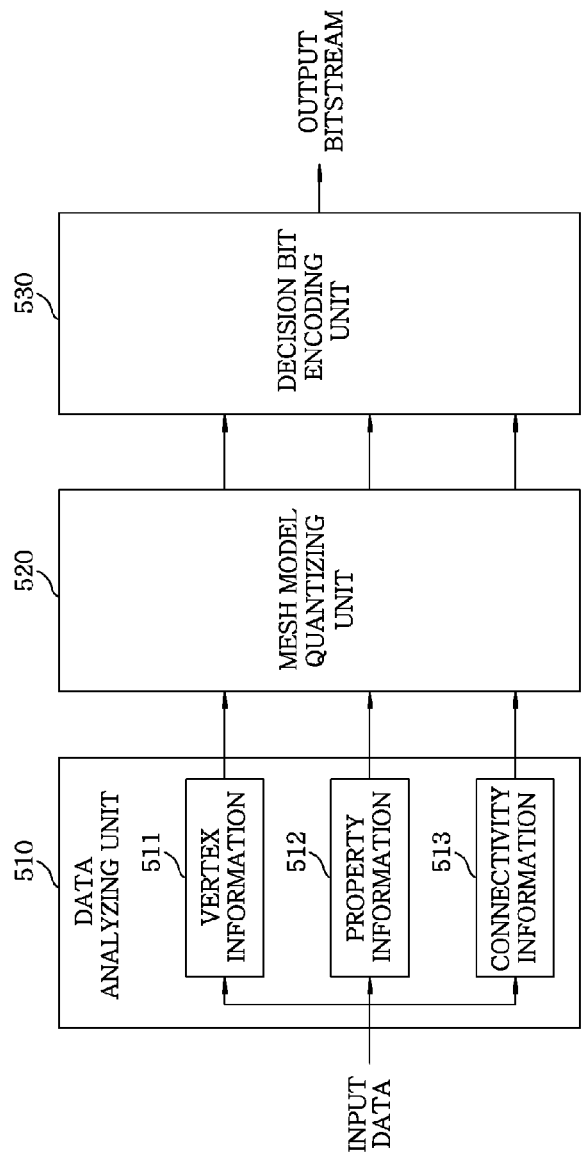
FIG. 8 is a block diagram of an apparatus for 3D mesh compression, based on quantization in accordance with the present invention.

FIG. 8 is a block diagram of a 3D mesh compression apparatus in accordance with an embodiment of the present invention.

Referring to FIG. 8, an apparatus for 3D mesh compression in accordance with the present invention includes a data analyzing unit 510, a mesh model quantizing unit 520, and a decision bit encoding unit 530.

In the apparatus for compression of a 3D mesh model, the data analyzing unit 510 analyzes data of the 3D mesh model being input and decomposes the data into vertices information 511 specific to vertices of the 3D model, property information 512 specific to property of the 3D model, and connectivity information 513 between vertices of the 3D model specific to associations.

More specifically, the vertices information 511 can be represented by 3D coordinates of vertices of a 3D model. A single vertex can be represented by three floating-point numbers indicating the x, y and z-coordinates.

The property information 512 can include normals, colors, and texture coordinates of a FaceSet representing the 3D mesh model.

The connectivity information 513 can be represented by an index list containing indices of three or more vertices forming a polygon and the index list is referred to as IndexedFaceSet or FaceSet in the present invention.

The data analyzing unit 510 may include an operating unit (not shown) and the operating unit can be implemented by, e.g., a microprocessor, which can subdivide a large 3D mesh model having a complexity value greater than a preset complexity threshold into multiple smaller 3D mesh models. Further, the data analyzing unit 510 may also include a header (not shown) storing data about the vertices, property and connectivity information of the 3D mesh model.

That is, when a 3D mesh model having too many vertices is coded, the 3D mesh coding apparatus may experience overload owing to excessive computations. Hence, to prevent coding errors or significant coding speed reduction due to the overload, a complexity threshold is set in advance so that a large 3D mesh model having a complexity value greater than the preset complexity threshold can be subdivided into multiple smaller 3D mesh models.

The complexity of a 3D mesh model can be determined in correspondence with the number of faces of the FaceSet forming the 3D mesh model, and can be adjusted in various ways according to operational environments or usage of the 3D mesh encoding apparatus.

The mesh model quantizing unit 520 can produce quantized vertex and property information by using vertex information 511 and property information 512 of a 3D mesh model, and connectivity information 513 between vertices of the 3D mesh model. And these three values 511, 512 and 513 are analyzed from the data analyzing unit 510.

Figure 1:
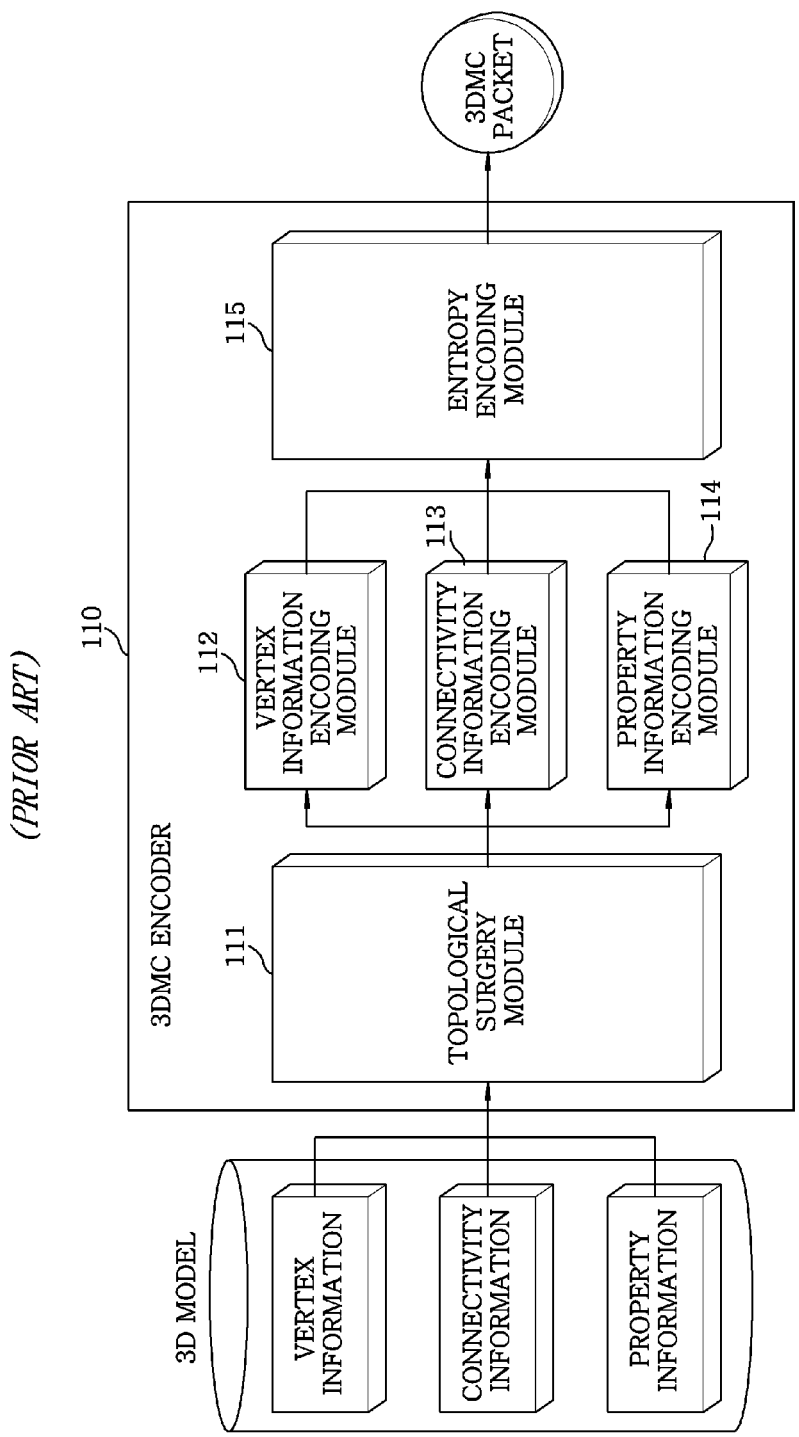
FIG. 1 is a block diagram of an existing 3DMC encoder.

The mesh model quantizing unit 520 can produce quantized values by using Math Figure 1.

MathFigure 1

$$Q(x_i) = \text{floor}\left[\frac{x_i - \min}{\max - \min} \times (2^t - 1) + 0.5\right] \quad [\text{Math. 1}]$$

Where, 'floor[ ]', '$X_i$', 't' denote a round down operation, an input value of a quantization and a quantization parameter, respectively. Further, 'max' and 'min' denote maximum and minimum value of the input value, respectively.

Figure 2:
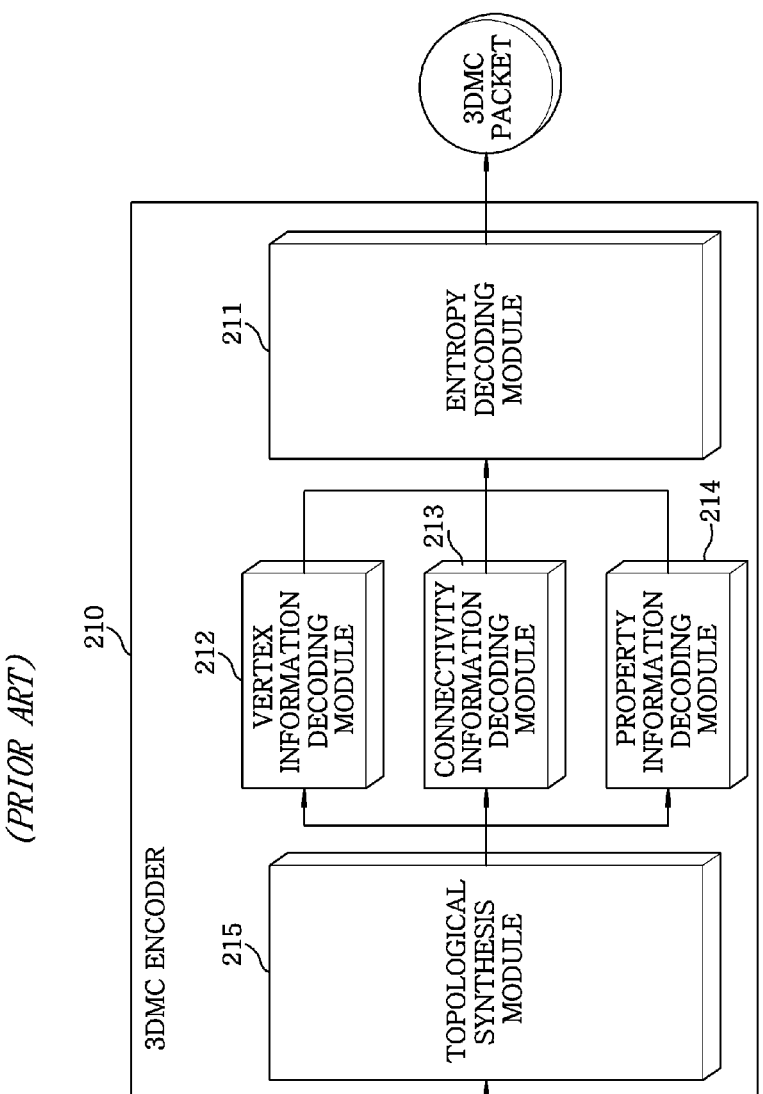
FIG. 2 is a block diagram of a 3DMC decoder corresponding to the 3DMC encoder of FIG. 1.
Figure 3:
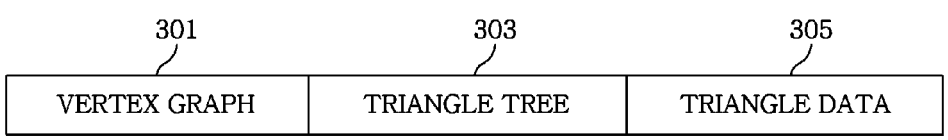
FIG. 3 illustrates an overall structure of a bitstream representing mesh information of a 3D model produced by the encoder of FIG. 1.
Figure 4:
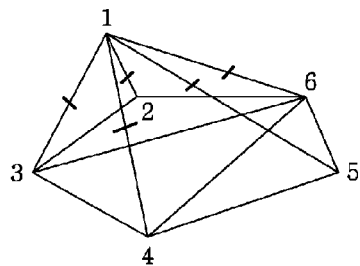
FIGS. 4 to 7 illustrate steps of topological surgery of a mesh of a conventional 3D model.
Figure 5:
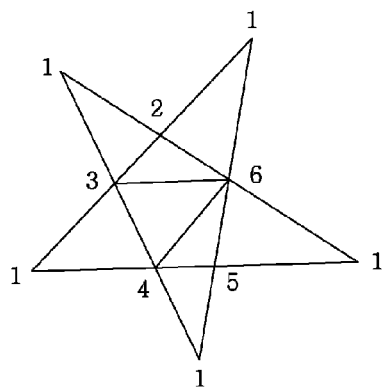
Figure 6:
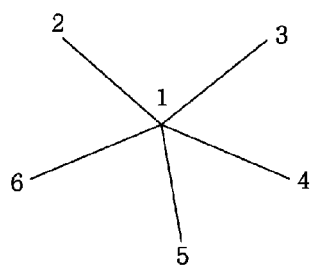
Figure 7:
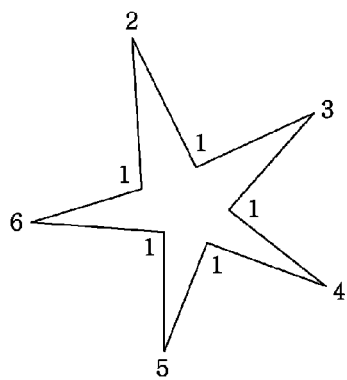

For more precise quantization, a quantization equation may be differently defined for each axis. In Math Figure 1, the value of the whole section is calculated by subtracting the minimum value from the maximum value (i.e., max−min). In a conventional method, the value is uniformly applied to each axis (x-axis, y-axis and z-axis). However, in the present invention, the value is different for each axis, based on Math Figure 2 which can be expressed as Math Figure 2.

MathFigure 2

$$V_i = (x_i, y_i, z_i) \quad [\text{Math. 2}]$$
$$Q(x_i) = \text{floor}\left[\frac{x_i - \min_x}{\max_x - \min_x} \times (2^t - 1) + 0.5\right]$$
$$Q(y_i) = \text{floor}\left[\frac{y_i - \min_y}{\max_y - \min_y} \times (2^t - 1) + 0.5\right]$$
$$Q(z_i) = \text{floor}\left[\frac{z_i - \min_z}{\max_z - \min_z} \times (2^t - 1) + 0.5\right]$$

wherein, $V_i$ indicates an input value which is three-dimensionally formed.

The decision bit encoding unit 530 calculates ceil[$\log_2 N$] with respect to the number of the connectivity information quantized by the mesh model quantizing unit 520, to calculate a decision bit. The decision bit encoding unit 530 encodes the quantized vertex information, property information and connectivity information by using the calculated decision bit, to output encoded data in the form of a bit-stream. In this case, ceil[ ] indicates a round up operation, and N has a value of "the number of vertices".

Figure 9:
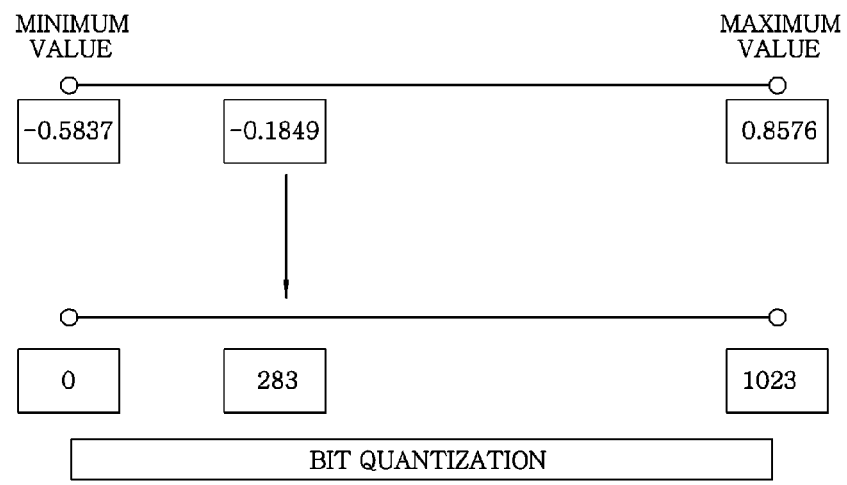
FIG. 9 illustrates a quantization scheme employed in the present invention.

FIG. 9 illustrates the quantization scheme employed in the present invention.

As illustrated in FIG. 9, the minimum value is '0.5837', the maximum value is '0.8576 ' and hence the quantization interval becomes '1.4413' (0.8576−(−0.5837)).

With the quantization level of 10 bits, dividing the interval '1.4413' by the number of steps '1024' produces the step size '0.0019' Using Math Figure 1, a data value of '0.8419' is quantized into an integer value of '283'.

FIG. 9 illustrates the result of calculating the quantization value of −0.1849, and the theorem of Math Figure 1 is generalized by employing a quantization level of each of x, y and z axes.

Figure 10:
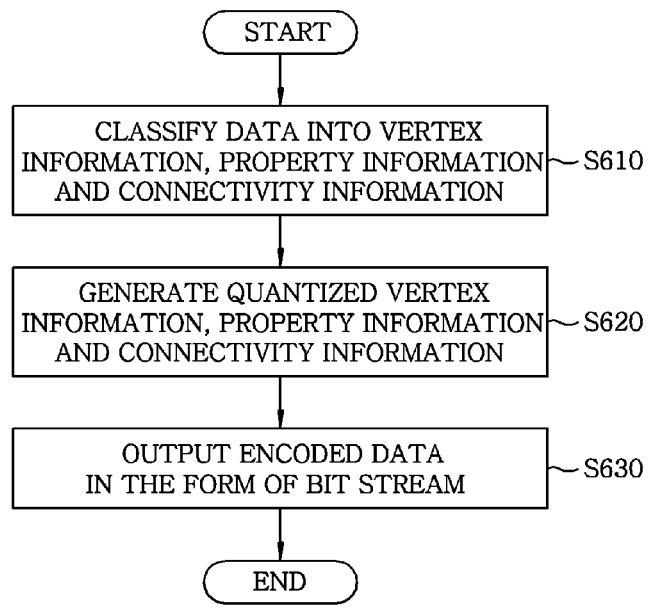
FIG. 10 is a flow chart of a method for 3D mesh compression, based on quantization in accordance with the present invention.

FIG. 10 is a flow chart of a method for 3D mesh compression in accordance with the present invention.

Referring to FIG. 10, vertices information specific to vertices of the 3D model, property information specific to property of the 3D model, and connectivity information between vertices of the 3D model specific to associations are decomposed from the inputted 3D mesh model (S610).

That is, the 3D mesh model is composed of the vertex information, property information and connectivity information. Among such information, the vertex information may be represented by coordinate information indicating a 3D location of a vertex forming the 3D mesh model. The coordinate information may be represented by 3D coordinates using a floating point. The coordinate information is represented by coordinates which are arrayed on each of the x, y and z axes and have a real value on each axis.

The property information includes normals, colors, and texture coordinates of unit polygons forming the 3D mesh model.

The connectivity information is represented by an index list containing indices of three or more vertices forming a polygon, which is referred to as IndexedFaceSet or FaceSet.

Further, decomposing the connectivity information between vertices constituting the 3D mesh model comprises storing data regarding the vertex, property and connectivity information of the 3D mesh model.

The decomposing the 3D mesh model into the connectivity information between vertices further comprises calculating complexity value of the 3D mesh model, and subdividing the 3D mesh model into the 3D mesh model into multiple smaller mesh when the computed complexity value is greater than a preset complexity threshold.

As described above, when a 3D mesh model having too many vertices is coded, the 3D mesh coding apparatus may experience overload owing to excessive computations. Hence, to prevent coding errors or significant coding speed reduction due to the overload, a complexity threshold is set in advance so that a large 3D mesh model having a complexity value greater than the preset complexity threshold can be subdivided into multiple smaller 3D mesh models.

The complexity of a 3D mesh model can be determined in correspondence with the number of faces of the FaceSet forming the 3D mesh model, and can be adjusted in various ways according to operational environments or usage of the 3D mesh encoding apparatus.

Next, quantized vertex information, property information and connectivity information are generated by using the decomposed vertex information, property information and connectivity information between the vertices of the 3D mesh model. An equation of performing quantization of each value can be expressed as Math Figure 1 provided above. The vertex information, property information and connectivity information which are quantized according to quantization levels are generated (S620).

Finally, a decision bit is calculated by calculating ceil [$\log_2 N$] of the number of the quantized connectivity information, and the quantized vertex information, property information and connectivity information are encoded by using the calculated decision bit, to output encoded data in the form of a bit-stream (S630).

Those skilled in the art will readily understand that steps of the present method can be implemented through general programming using various software and hardware technologies.

In addition, some steps of the present method may be implemented as computer-executable codes stored in a computer-readable storage medium. The computer-readable storage medium may be any of storage media that can store data readable by a computer system. Examples of the computer-readable storage medium include a ROM, RAM, CD-ROM, CD-RW, magnetic tape, floppy disk, HDD, optical disc, magnetooptical data storage, and carrier wave (for transmission through the Internet). The computer-executable codes may be distributed among and executed by computer systems connected through a network in a distributed manner.

While the invention has been shown and described with respect to the embodiments, it will be understood by those skilled in the art that various changes and modifications may be made without departing from the scope of the invention as defined in the following claims.

The invention claimed is:

1. An apparatus for 3D mesh compression based on quantization, comprising:
    a data analyzing unit for decomposing data of an input 3D mesh model into vertices information, property information representing property of the 3D mesh model, and connectivity information between vertices constituting the 3D mesh model;
    a mesh model quantizing unit for producing quantized vertices and property information of the 3D mesh model by using the vertices, property and connectivity information; and
    a decision bit encoding unit for calculating a decision bit by using the quantized connectivity information and then encoding the quantized vertex information, property information and connectivity information by using the decision bit,
    wherein the mesh model quantizing unit respectively performs the quantization for x-axis, y-axis and z-axis by differently defining a quantization equation for each axis.

2. The apparatus of claim 1, wherein the data analyzing unit comprises a microprocessor that computes a complexity value of the 3D mesh model, and subdivides, when the computed complexity value is greater than a preset complexity threshold, the 3D mesh model into multiple smaller mesh models.

3. The apparatus of claim 2, wherein the complexity value of the 3D mesh model is determined by the number of faces in a FaceSet.

4. The apparatus of claim 1, wherein the connectivity information is represented by an index list containing indices of multiple vertices forming a unit polygon.

5. The apparatus of claim 4, wherein the property information comprises normals, colors, and texture coordinates of unit polygons forming the 3D mesh model.

6. The apparatus of claim 1, wherein the data analyzing unit comprises a header storing data regarding the geometry, property and connectivity information of the 3D mesh model.

7. A method for 3D mesh compression based on quantization, comprising:
    decomposing an input 3D mesh model into vertices information, property information representing property of the 3D mesh model, and connectivity information between vertices constituting the 3D mesh model;
    producing quantized vertices, property and connectivity information of the 3D mesh model by using the vertices, property and connectivity information;
    calculating a decision bit by using the quantized connectivity information, and then encoding the quantized vertex information, property information and connectivity information by using the decision bit; and
    performing the quantization for x-axis, y-axis and z-axis by differently defining a quantization equation for each axis.

8. The method of claim 7, wherein decomposing the connectivity information between vertices constituting the 3D mesh model further comprises:
    calculating complexity of the 3D mesh model; and
    subdividing the 3D mesh model into multiple mesh according to the result of comparing complexity value of the calculated 3D mesh model and preset complexity.

9. The method of claim 8, wherein the complexity value is determined by the number of faces in a FaceSet representing the 3D mesh model.

10. The method of claim 7, wherein the connectivity information is represented by an index list containing indices of multiple vertices forming a polygon.

11. The method of claim 10, wherein the property information comprises normals, colors, and texture coordinates of polygons forming the 3D mesh model.

12. The method of claim 7, wherein decomposing the connectivity information between vertices constituting the 3D mesh model further comprises storing data regarding the vertex, property and connectivity information of the 3D mesh model.

* * * * *